(12) United States Patent
Ozaki et al.

(10) Patent No.: US 12,429,057 B2
(45) Date of Patent: Sep. 30, 2025

(54) PUMP

(71) Applicant: Nidec Corporation, Kyoto (JP)

(72) Inventors: Kosei Ozaki, Kyoto (JP); Takaaki Bando, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 91 days.

(21) Appl. No.: 18/237,964

(22) Filed: Aug. 25, 2023

(65) Prior Publication Data

US 2024/0068479 A1 Feb. 29, 2024

(30) Foreign Application Priority Data

Aug. 26, 2022 (JP) ................... 2022-134692

(51) Int. Cl.
*F04D 13/06* (2006.01)
*H02K 5/04* (2006.01)
*F04D 1/00* (2006.01)

(52) U.S. Cl.
CPC ..... *F04D 13/0626* (2013.01); *F04D 13/0606* (2013.01); *F04D 13/0633* (2013.01); *F04D 13/064* (2013.01); *H02K 5/04* (2013.01); *F04D 1/00* (2013.01)

(58) Field of Classification Search
CPC .. F04D 13/0633; F04D 13/06; F04D 13/0606; F04D 13/0626; F04D 29/026; F04D 1/00; F04D 13/026; F04D 29/046; F04D 29/0462; F04D 29/0473; F04D 29/426; F04D 29/62; H02K 5/04; H02K 5/10; H02K 7/14
See application file for complete search history.

(56) References Cited

U.S. PATENT DOCUMENTS

2022/0399768 A1* 12/2022 Aso ................. F04D 13/0633
2022/0403852 A1* 12/2022 Pae ................. F04D 29/026

FOREIGN PATENT DOCUMENTS

| CN | 102410230 B | * | 9/2015 | ........... F04D 13/064 |
|---|---|---|---|---|
| JP | 2012067659 A | * | 4/2012 | ........... F04D 13/064 |

* cited by examiner

*Primary Examiner* — Dominick L Plakkoottam
(74) *Attorney, Agent, or Firm* — Keating & Bennett, LLP

(57) ABSTRACT

A pump includes an upper casing, a lower casing, a can, an impeller, and a motor. The upper casing includes a suction port through which a fluid is suctioned and a discharge port through which the fluid is discharged. The lower casing is located below the upper casing. The can is accommodated in the lower casing. The impeller is accommodated in the upper casing. The motor includes a rotor and a stator connected to the impeller. The rotor is accommodated in the can. The stator is located between an inner peripheral surface of the lower casing and an outer peripheral surface of the can. The can includes a protruding portion protruding in a radial direction from the outer peripheral surface. A lower end of the protruding portion and an upper end of the stator come into contact with each other.

9 Claims, 7 Drawing Sheets

PUMP

CROSS-REFERENCE TO RELATED APPLICATIONS

The present application claims priority under 35 U.S.C. § 119 to Japanese Patent Application No. 2022-134692, filed on Aug. 26, 2022, the entire contents of which are hereby incorporated herein by reference.

1. FIELD OF THE INVENTION

The present disclosure relates to a pump.

2. BACKGROUND

A pump includes a casing, a stator, an impeller having a rotor, and a bracket. The bracket is accommodated in the casing, and the impeller is accommodated inside the bracket. The stator is provided in the casing.

In the conventional pump, the positioning accuracy between the stator and the rotor is low. As a result, the positional relationship between the stator and the rotor varies, and there is a concern that a rotor having poor rotation efficiency is produced.

SUMMARY

A pump according to an example embodiment of the present disclosure includes an upper casing, a lower casing, a can, an impeller, and a motor. The upper casing includes a suction port portion through which a fluid is suctioned and a discharge port portion through which the fluid is discharged. The lower casing is located below the upper casing. The can is accommodated in the lower casing. The impeller is accommodated in the upper casing. The motor includes a rotor and a stator connected to the impeller. The rotor is accommodated in the can. The stator is located between an inner peripheral surface of the lower casing and an outer peripheral surface of the can. The can includes a protruding portion protruding in a radial direction from the outer peripheral surface. A lower end of the protruding portion and an upper end of the stator come into contact with each other.

The above and other elements, features, steps, characteristics and advantages of the present disclosure will become more apparent from the following detailed description of the example embodiments with reference to the attached drawings.

DETAILED DESCRIPTION

Hereinafter, example embodiments of the present disclosure will be described with reference to the accompanying drawings. The present description appropriately describes a first direction Z, a second direction X, and a third direction Y orthogonal to one another for easy understanding. Here, a direction from the lower casing toward the upper casing is referred to as a "first direction Z". A direction orthogonal to the first direction Z is referred to as "second direction X". A direction orthogonal to the first direction Z and the second direction X is referred to as "third direction Y".

A direction on one side in the first direction Z is referred to as "one side (+Z direction) in the first direction", and a direction on the other side is referred to as "other side (−Z direction) in the first direction". A direction on one side in the second direction X is referred to as "one side (+X direction) in the second direction", and a direction on the other side is referred to as "other side (−X direction) in the second direction". A direction on one side in the third direction Y is referred to as "one side (+Y direction) in the third direction", and a direction on the other side is referred to as "other side (−Y direction) in the third direction".

In the present application, for convenience, the first direction Z may be described as an up-down direction. For example, the one side (+Z direction) in the first direction Z indicates the upward direction, and the other side (−Z direction) in the first direction Z indicates the downward direction. However, the up-down direction, an upward direction, and a downward direction are defined for convenience of description, and do not need to coincide with the vertical direction. The up-down direction is merely defined for convenience of description, and the orientation of the pump according to the present disclosure at the time of use is not limited. In the present description, "orthogonal direction" does not represent orthogonal in a strict sense, and includes, for example, a case of being orthogonal to a degree to which the effects of the present disclosure are achieved.

Figure 1:
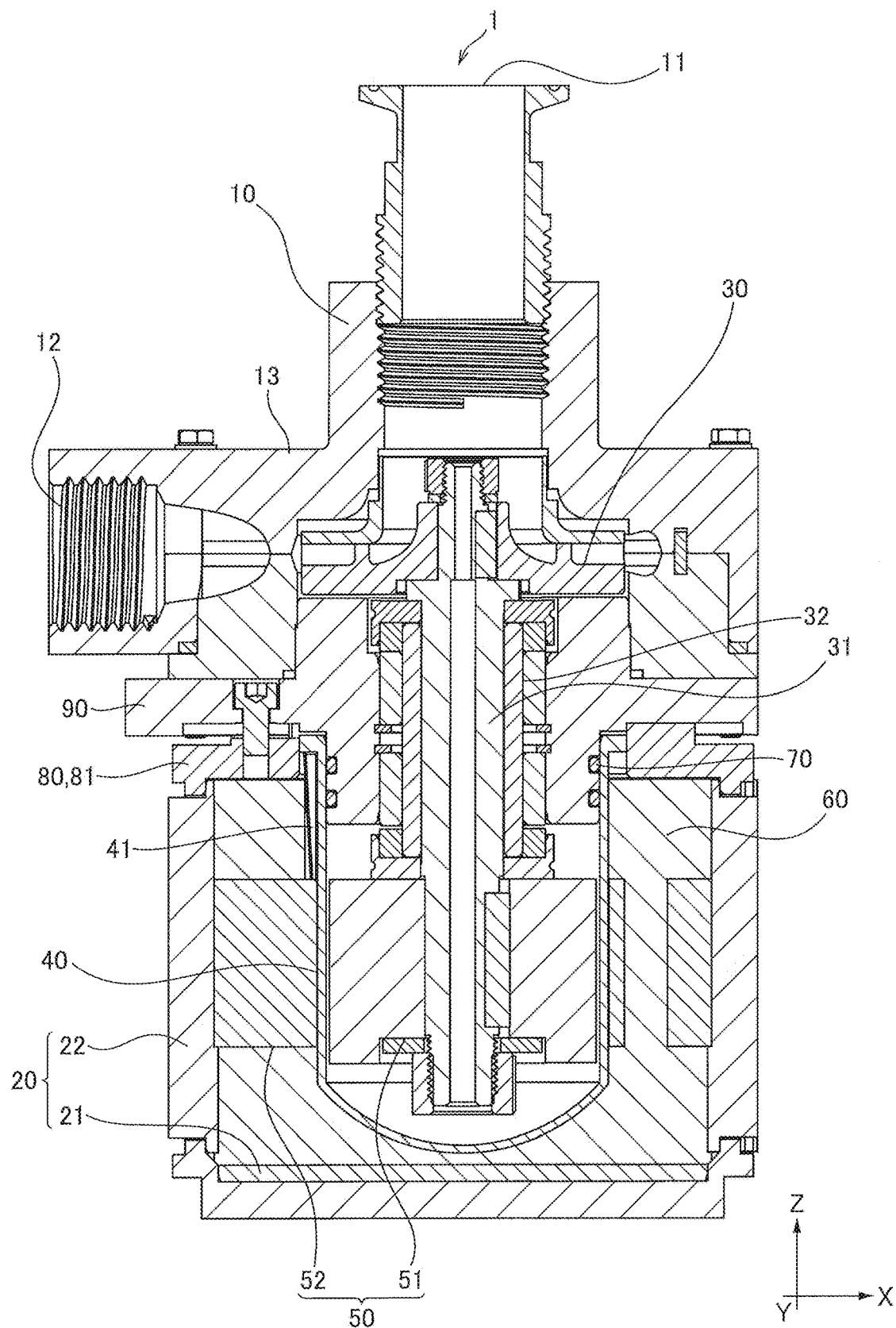
FIG. 1 is an overall cross-sectional view of a pump according to an example embodiment of the present disclosure.

A pump 1 according to an example embodiment of the present disclosure will be described. FIG. 1 is an overall cross-sectional view of the pump 1 according to the present example embodiment. As illustrated in FIG. 1, the pump 1 includes an upper casing 10, a lower casing 20, a can 40, a lid 80, an impeller 30, a shaft 31, and a motor 50.

The upper casing 10 includes a chassis 13, a suction port portion 11, and a discharge port portion 12. The shape of the suction port portion 11 is, for example, a cylindrical shape. The suction port portion 11 is disposed above the chassis 13. The suction port portion 11 is disposed along the first direction Z. The shape of the discharge port portion 12 is, for example, a cylindrical shape. The discharge port portion 12 is disposed on a side of the chassis 13. The discharge port portion 12 is disposed along the second direction X.

A fluid is suctioned in the suction port portion 11. The fluid is discharged from the discharge port portion 12. As the fluid, for example, an antifreeze liquid such as an ethylene glycol aqueous solution or a propylene glycol aqueous solution, pure water, or the like is available.

The lower casing 20 is disposed below the upper casing 10. Specifically, the lower casing 20 includes a circular bottom wall 21 and a cylindrical side wall 22.

Figure 2:
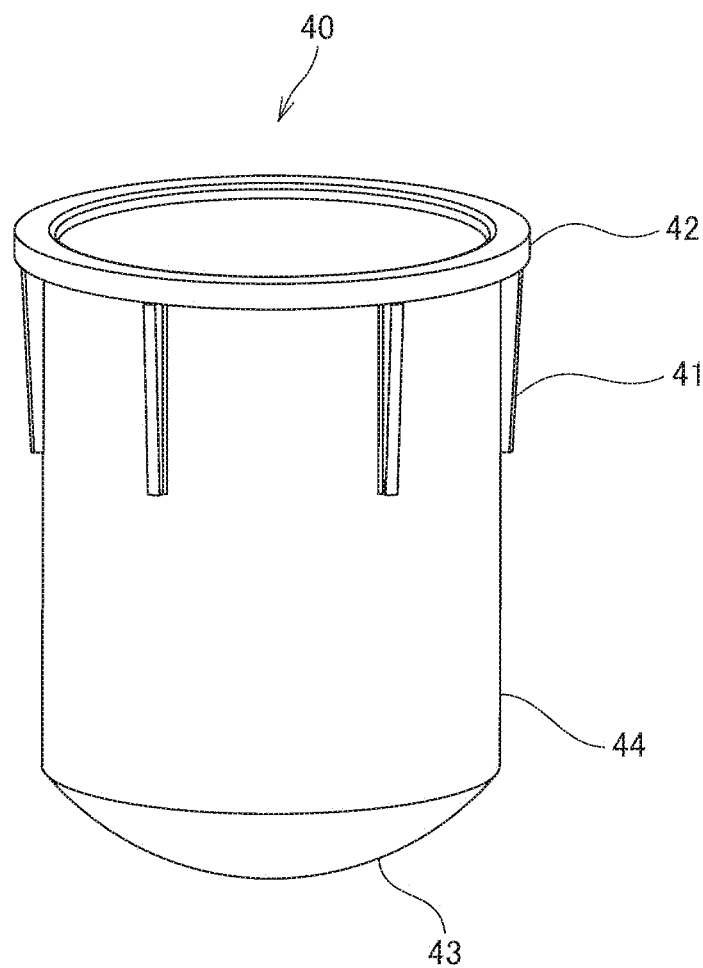
FIG. 2 is an overall perspective view of a can according to the present example embodiment.

Here, the can 40 will be described with reference to FIGS. 1 and 2. FIG. 2 is an overall perspective view of the can 40 according to the present example embodiment. As illustrated in FIGS. 1 and 2, the can 40 includes a hemispherical bottom wall 43 and a cylindrical side wall 44. The diameter of the bottom wall 43 is smaller than the diameter of the bottom wall 21. The height of the side wall 44 is smaller than the height of the side wall 22. The can 40 is accommodated in the lower casing 20.

The can 40 further includes a protruding portion 41. Specifically, the can 40 further includes a plurality of protruding portions 41. The plurality is, for example, six. Each of the six protruding portions 41 protrudes in the radial direction from the outer peripheral surface of the side wall 44. Further, each of the six protruding portions 41 extends along the axial direction. Note that the number of the protruding portions 41 may be one or may extend along the circumferential direction. Furthermore, the plurality of protruding portions 41 may be provided, and the shape of each of the plurality of protruding portions 41 may be a cube.

Figure 3:
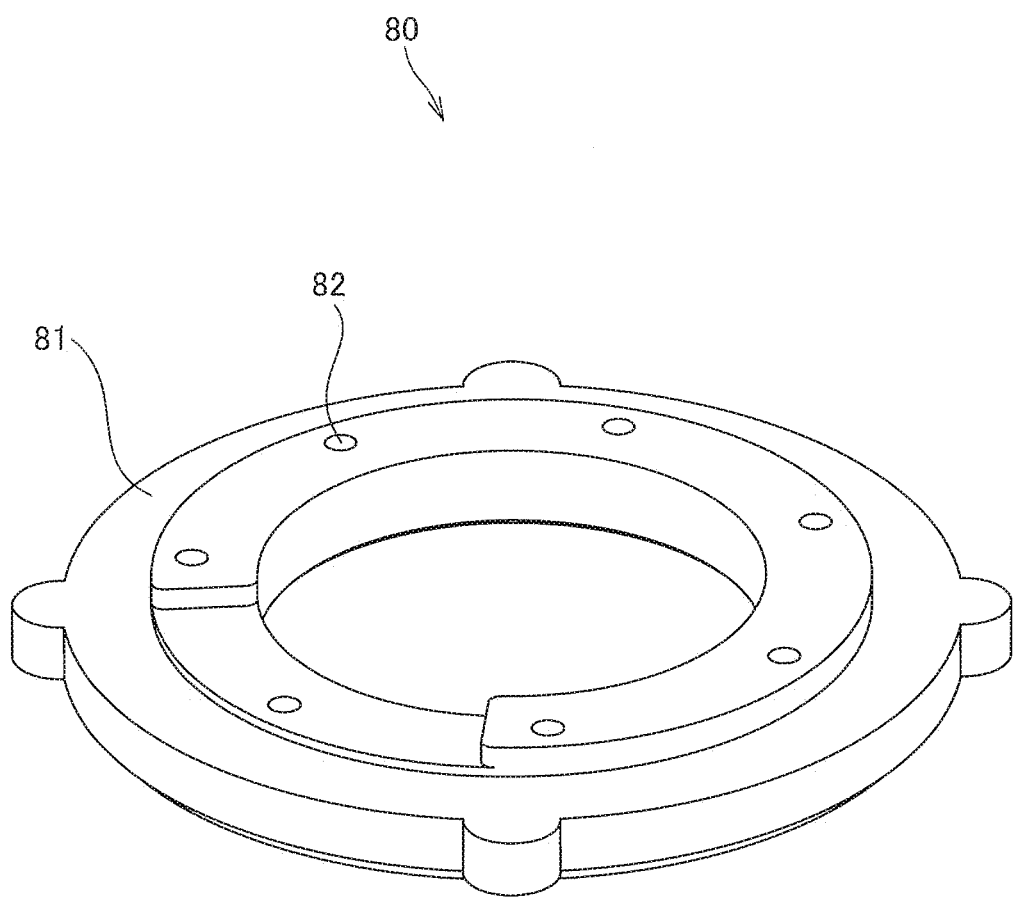
FIG. 3 is an overall perspective view of a lid according to the present example embodiment.

Here, the lid 80 will be described with reference to FIGS. 1 to 3. FIG. 3 is an overall perspective view of the lid 80 according to the present example embodiment. As illustrated in FIGS. 1 to 3, the lid 80 includes a plate-shaped body 81 disposed at an upper end of the lower casing 20. The shape of the lid 80 is, for example, an annular shape. The lid 80 faces the outer peripheral surface of the can 40 in the radial direction. As a result, the fluid flows into the space formed by the upper casing 10 and the can 40. On the other hand, it is difficult for the fluid to enter the space formed by the lower casing 20 and the can 40.

The lid 80 further includes a through hole 82 penetrating the plate-shaped body 81. As a result, after the lid 80 is disposed, a synthetic resin 60 described later can be injected from the through hole 82. The lid 80 may include a plurality of through holes 82.

The impeller 30 is accommodated in the upper casing 10. Specifically, the impeller 30 is disposed below the suction port portion 11. The impeller 30 is disposed on a side of the discharge port portion 12. The impeller 30 is disposed above the can 40.

In the radial direction, the maximum diameter of the impeller 30 is smaller than the maximum diameter of the can 40. As a result, the pump 1 can be downsized.

The motor 50 includes a rotor 51 and a stator 52. The shape of the rotor 51 is, for example, a cylindrical shape. The height of the rotor 51 is lower than the height of the side wall 44. The diameter of the rotor 51 is substantially the same as the inner diameter of the side wall 44. The rotor 51 is accommodated in the can 40. Specifically, the rotor 51 is disposed at a predetermined position of the can 40. Specifically, the rotor 51 is disposed below the impeller 30. The rotor 51 is connected to the impeller 30. Specifically, the rotor 51 is connected to the impeller 30 via the shaft 31. This structure allows the impeller 30 to rotate along with rotation of the rotor 51. The fluid flows from the suction port portion 11 to the discharge port portion 12 by the rotation of the impeller 30.

The stator 52 has a cylindrical shape. The height of the stator 52 is substantially the same as the height of the rotor 51. The inner diameter of the stator 52 is substantially the same as the outer diameter of the side wall 44. The outer diameter of the stator 52 is substantially the same as the inner diameter of the side wall 22. The stator 52 is disposed between the inner peripheral surface of the lower casing 20 and the outer peripheral surface of the can 40. Specifically, the lower end of the protruding portion 41 of the can 40 and the upper end of the stator 52 are in contact with each other. As a result, the can 40 is positioned with respect to the stator 52 by the protruding portion 41. Therefore, the accuracy of the positional relationship between the can 40 and the stator 52 is improved. In other words, the accuracy of the positional relationship between the rotor 51 and the stator 52 disposed at a predetermined position of the can 40 is improved. In addition, it is easy to position the stator 52 and the rotor 51 with high accuracy, variation in the positional relationship between the stator 52 and the rotor 51 can be suppressed, and deterioration in the rotation efficiency of the rotor 51 can be suppressed.

A synthetic resin 60 is injected between the inner peripheral surface of the lower casing 20 and the outer peripheral surface of the can 40. The synthetic resin 60 is, for example, cured. The synthetic resin 60 has, for example, water resistance. The synthetic resin 60 only needs to be able to coat the stator 52, and may be filled without a gap between the inner peripheral surface of the lower casing 20 and the outer peripheral surface of the can 40. As a result, even when the fluid enters between the inner peripheral surface of the lower casing 20 and the outer peripheral surface of the can 40, the stator 52 can be protected.

Next, a method for manufacturing the pump 1 will be described. First, the lower casing 20 is prepared. Next, the stator 52 is accommodated at a predetermined position in the lower casing 20. Next, the can 40 is accommodated in the lower casing 20. The lower end of the protruding portion 41 of the can 40 and the upper end of the stator 52 are in contact with each other. As a result, the can 40 is positioned with respect to the stator 52 by the protruding portion 41.

Next, the lid 80 is disposed at the upper end of the lower casing 20. Next, the synthetic resin 60 is injected from the through holes 82. In other words, the synthetic resin 60 can be injected from the through holes 82 after the lid 80 is disposed. Next, the synthetic resin 60 is cured. Next, the rotor 51 connected to the impeller 30 is accommodated in the can 40. Finally, the upper casing 10 is disposed above the lower casing 20. As a result, the pump 1 according to the present example embodiment is completed.

Figure 4:
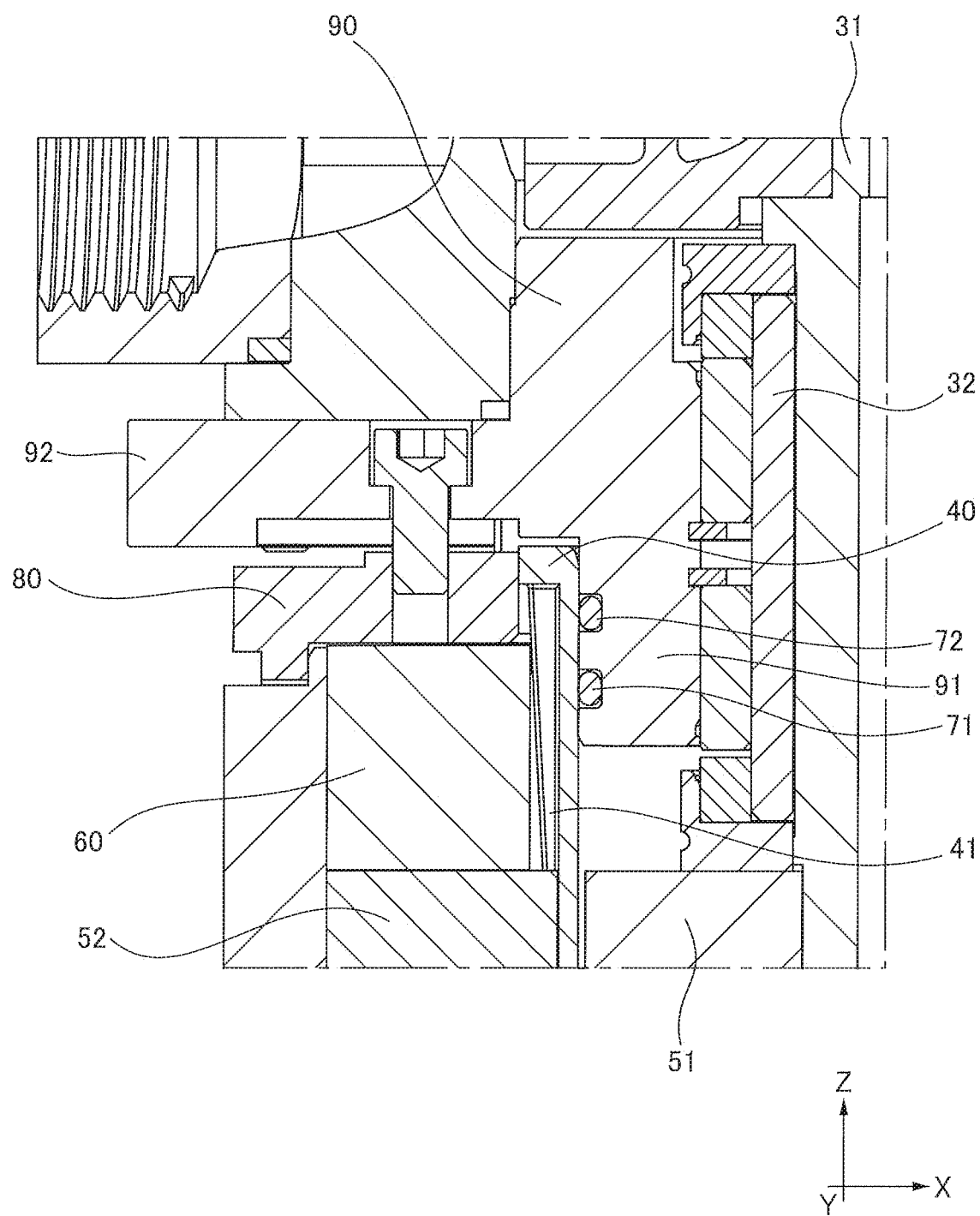
FIG. 4 is a cross-sectional view of the pump according to the present example embodiment.

The pump 1 will be described next in detail with reference to FIGS. 1 and 4. FIG. 4 is a cross-sectional view of the pump 1 according to the present example embodiment. As illustrated in FIG. 4, the pump 1 further includes a bearing portion 32 and a bearing holding portion 90.

The bearing portion 32 rotatably holds the shaft 31. The bearing portion 32 is, for example, a bearing. The bearing portion 32 has a cylindrical shape. The shaft 31 is accommodated in the bearing portion 32.

The bearing holding portion 90 holds the bearing portion 32. Specifically, the bearing holding portion 90 includes a cylindrical portion 91 and a plate-shaped portion 92. The cylindrical portion 91 has a cylindrical shape. The bearing portion 32 is accommodated in the cylindrical portion 91. The plate-shaped portion 92 has an annular shape. The plate-shaped portion 92 is disposed between the upper casing 10 and the lid 80.

The inner peripheral surface of the can 40 and the outer peripheral surface of the bearing holding portion 90 face each other. The seal 70 is disposed between the inner peripheral surface of the can 40 and the outer peripheral surface of the bearing holding portion 90. The seal 70 is, for example, an O-ring or a metal gasket. Specifically, a plurality of seals 70 are disposed between the inner peripheral surface of the can 40 and the outer peripheral surface of the cylindrical portion 91. The plurality of seals 70 include, for example, a first O-ring 71 and a second O-ring 72. The first O-ring 71 is disposed above the second O-ring 72. As a result, the leakage of the fluid in the can 40 can be suppressed.

Figure 5:
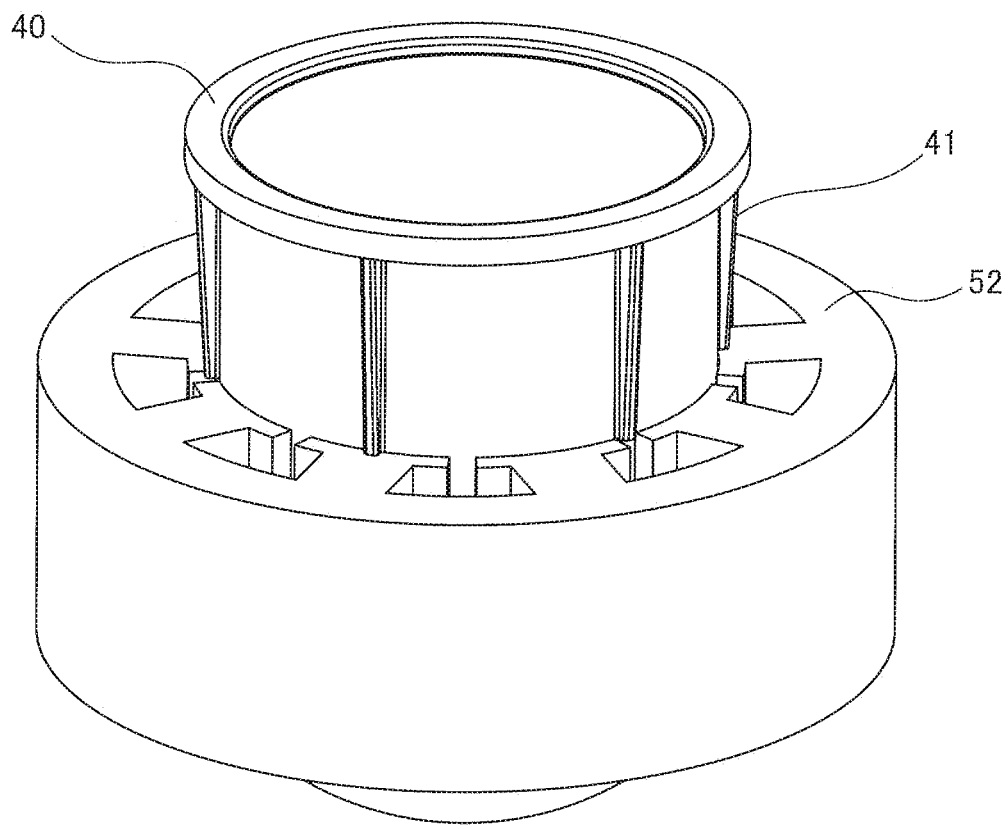
FIG. 5 is a perspective view of a stator and a can according to the present example embodiment.
Figure 6:
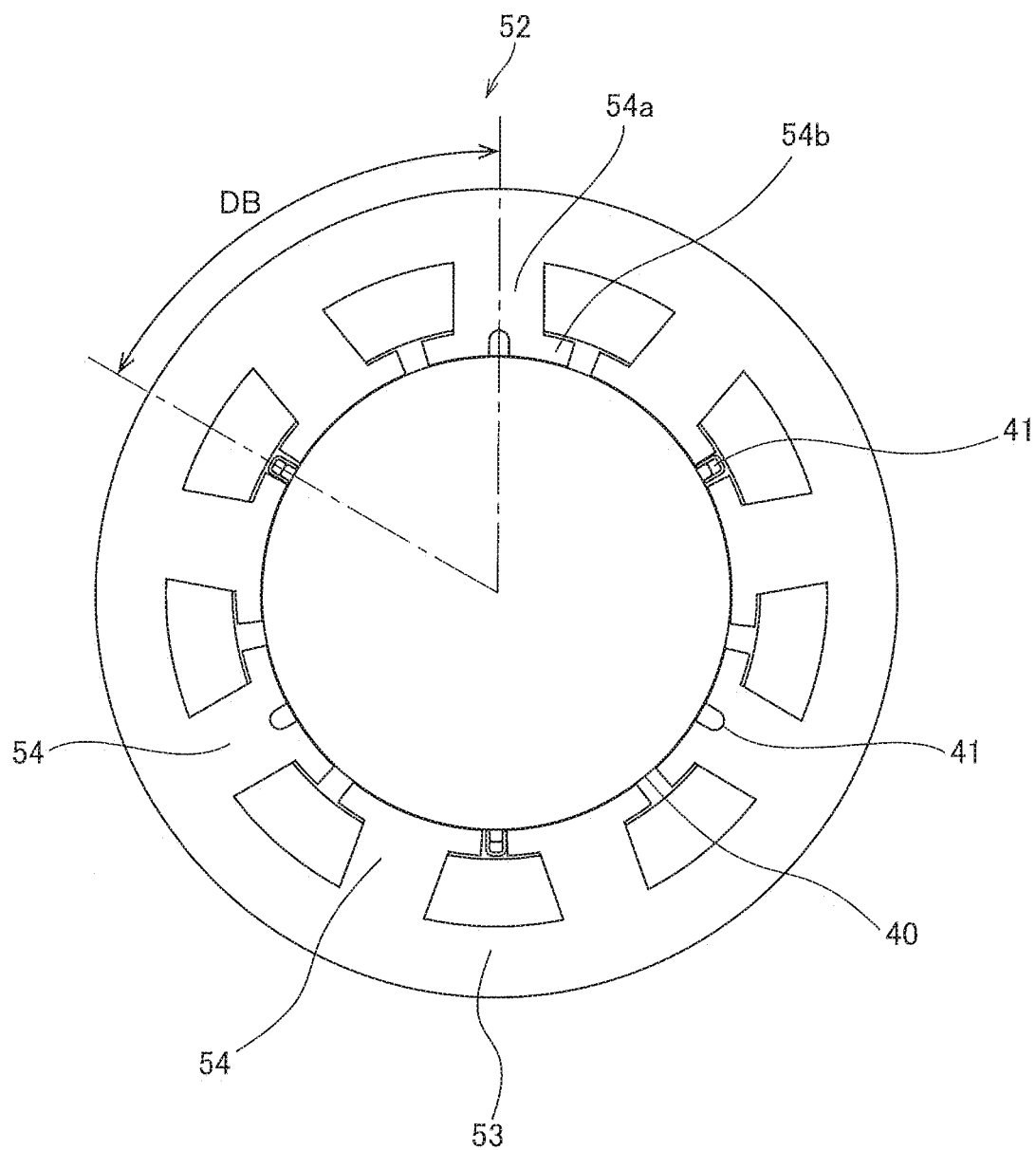
FIG. 6 is a plan view of the stator and the can according to the present example embodiment.
Figure 7:
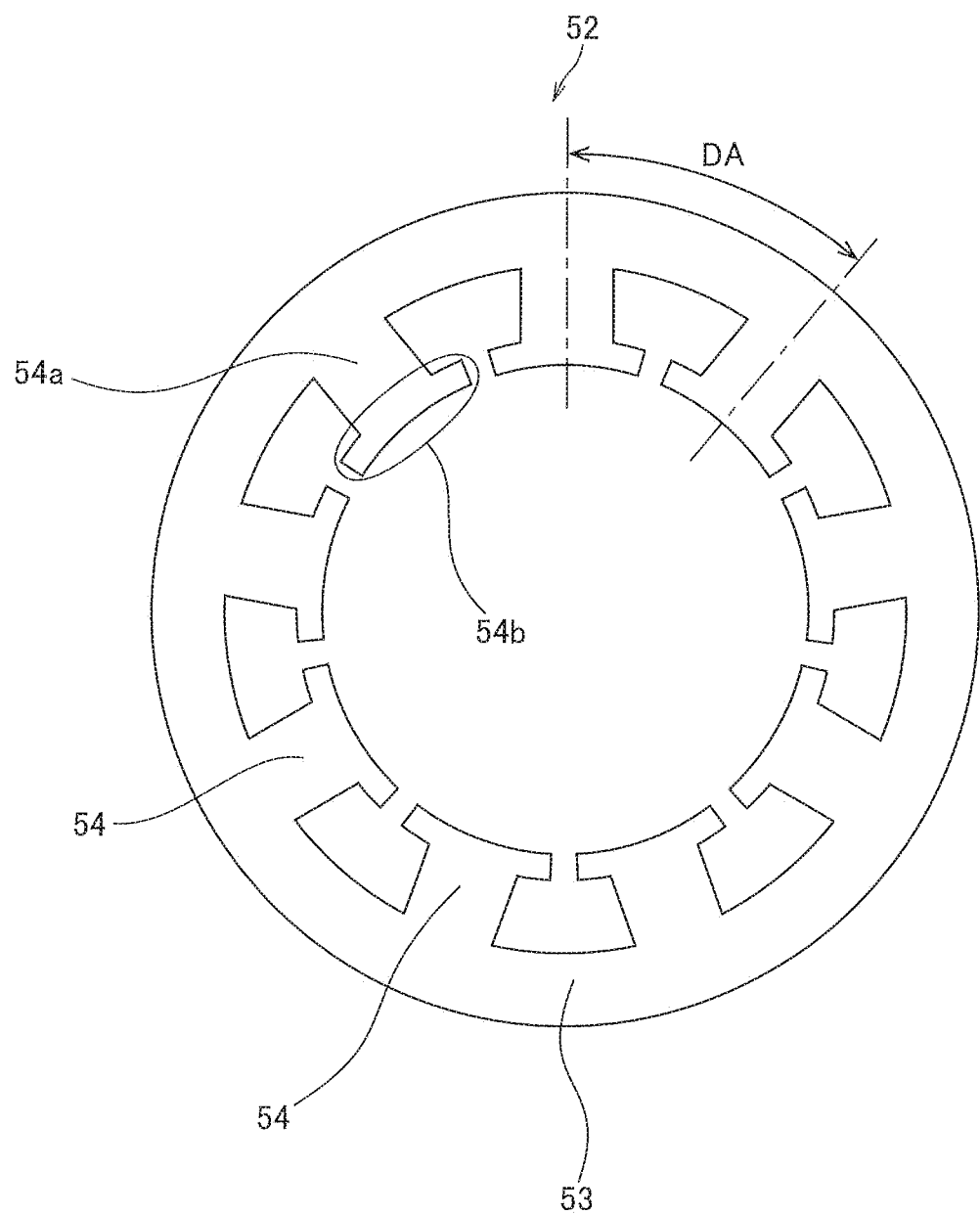
FIG. 7 is a perspective view of the stator according to the present example embodiment.

Next, the stator 52 will be described in detail with reference to FIGS. 5 to 7. FIG. 5 is a perspective view of the stator 52 and the can 40 according to the present example embodiment. FIG. 6 is a plan view of the stator 52 and the can 40 according to the present example embodiment. FIG. 7 is a perspective view of the stator 52 according to the present example embodiment. As illustrated in FIGS. 5 to 7, the stator 52 includes an annular body 53 and stator teeth 54.

Specifically, the stator 52 includes the plurality of stator teeth 54. The plurality is, for example, nine. Each of the nine stator teeth 54 includes a winding portion 54a and a distal end portion 54b.

The winding portion 54a protrudes in the radial direction from the inner peripheral surface of the annular body 53. A conductive wire is wound around the winding portion 54a. The distal end portion 54b is disposed at the distal end of the winding portion 54a. The distal end portion 54b extends along the circumferential direction. In other words, the shape of the distal end portion 54b is an arc shape. The lower end of the protruding portion 41 and the upper end of the distal end portion 54b are in contact with each other. As a result, the can 40 is positioned with respect to the stator 52 without affecting the winding portion 54a.

The position of the winding portion 54a and the position of the protruding portion 41 overlap in the circumferential direction. Specifically, the position of at least one winding portion 54a and the position of at least one protruding portion 41 overlap in the circumferential direction. As a result, even when the lower end of the protruding portion 41 and the upper end of the stator 52 come into contact with each other, the lower end of the protruding portion 41 comes into contact with the distal end of the winding portion 54a, and the deformation of the stator 52 can be suppressed as compared with a case where the lower end of the protruding portion 41 comes into contact with the distal end portion 54b.

The nine stator teeth 54 are arranged at equal intervals along the circumferential direction. Specifically, the nine stator teeth 54 are arranged at a first interval DA along the circumferential direction. In other words, the stator teeth 54 are arranged every 40°.

On the other hand, one protruding portion 41 out of the six protruding portions 41 and the other protruding portion 41 out of the six protruding portions 41 are arranged at a second interval DB along the circumferential direction. A magnitude DB of the second interval is not a multiple of a magnitude DA of the first interval. As a result, the lower end of the protruding portion 41 and the upper end of the stator 52 can be brought into contact with each other without aligning the stator 52 and the can 40. Specifically, the lower ends of the three protruding portions 41 and the upper ends of the three stators 52 are in contact with each other.

The six protruding portions 41 are arranged at equal intervals along the circumferential direction. Specifically, the six protruding portions 41 are arranged at the second interval DB along the circumferential direction. In other words, the stator teeth 54 are arranged every 60°. As a result, the deformation of the stator 52 can be further suppressed.

The can 40 further includes a flange portion 42. The flange portion 42 is disposed on the outer peripheral surface of the can 40. Specifically, the flange portion 42 is disposed on the outer peripheral surface of the upper end of the side wall 44. The flange portion 42 has an annular shape.

The upper end of each of the six protruding portions 41 and the lower end of the flange portion 42 are connected. As a result, the rigidity of the can 40 can be increased, and the deformation of the can 40 can be suppressed.

The example embodiments of the present disclosure have been described above with reference to the drawings. However, the above example embodiments are merely examples of the present disclosure, and the present disclosure is not limited to the above example embodiments, and can be implemented in various aspects without departing from the gist of the present disclosure. The drawings schematically show respective constituent elements mainly for easy understanding, and the thickness, length, number, and the like of the respective constituent elements that are shown may be different from the actual ones for convenience of the drawings. The material, shape, dimensions, and the like of the respective constituent elements described in the above example embodiments are merely examples and are not particularly limited, and various modifications can be made without substantially departing from the effects of the present disclosure. The configuration of the example embodiment may be appropriately modified without departing from the technical idea of the present disclosure. Example embodiments may also be implemented in combination as far as possible.

The present technology can also adopt the following configurations.

(1) A pump including an upper casing including a suction port portion through which a fluid is suctioned and a discharge port portion through which the fluid is discharged; a lower casing disposed below the upper casing; a can accommodated in the lower casing; an impeller accommodated in the upper casing; and a motor including a rotor and a stator connected to the impeller, wherein the rotor is accommodated in the can, the stator is disposed between an inner peripheral surface of the lower casing and an outer peripheral surface of the can, the can includes a protruding portion protruding in a radial direction from the outer peripheral surface, and a lower end of the protruding portion and an upper end of the stator come into contact with each other.

(2) The pump according to (1), further comprising: a bearing portion that rotatably holds a shaft connected to the rotor and the impeller; and a bearing holding portion that holds the bearing portion, wherein an inner peripheral surface of the can and an outer peripheral surface of the bearing holding portion face each other, and a seal is disposed between the inner peripheral surface of the can and the outer peripheral surface of the bearing holding portion.

(3) The pump according to (1) or (2), wherein the stator includes an annular body and stator teeth, the stator teeth include a winding portion protruding in a radial direction from an inner peripheral surface of the annular body, and a distal end portion disposed at a distal end of the winding portion, and a lower end of the protruding portion and an upper end of the distal end portion are in contact with each other.

(4) The pump according to (3), wherein the position of the winding portion and the position of the protruding portion overlap in the circumferential direction.

(5) The pump according to any one of (1) to (4), wherein the stator includes a plurality of the stator teeth, the can includes a plurality of the protruding portions, the plurality of stator teeth are arranged at a first interval DA along the circumferential direction, one of the plurality of protruding portions and the other of the plurality of protruding portions are arranged at a second interval DB along the circumferential direction, and DB is not a multiple of DA.

(6) The pump according to (5), wherein the plurality of protruding portions are arranged at the second interval DB along the circumferential direction.

(7) The pump according to any one of (1) to (6), wherein the can further includes a flange portion, the flange portion is disposed on an outer peripheral surface of the can, the protruding portion extends along the axial direction, and an upper end of the protruding portion and a lower end of the flange portion are connected.

(8) The pump according to any one of (1) to (7), wherein a synthetic resin is injected between the inner peripheral surface of the lower casing and the outer peripheral surface of the can.

(9) The pump according to any one of (1) to (8), further comprising a lid radially facing the outer peripheral surface of the can, wherein the lid includes a plate-shaped body disposed at an upper end of the lower casing a through hole penetrating the plate-shaped body.

(10) The pump according to any one of (1) to (9), wherein a maximum diameter of the impeller is smaller than a maximum diameter of the can in a radial direction.

Features of the above-described example embodiments and the modifications thereof may be combined appropriately as long as no conflict arises.

While example embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A pump comprising:
   an upper casing including a suction port portion through which a fluid is suctioned and a discharge port portion through which the fluid is discharged;
   a lower casing located below the upper casing;
   a can accommodated in the lower casing;
   an impeller accommodated in the upper casing; and
   a motor including a rotor and a stator connected to the impeller; wherein
   the rotor is accommodated in the can;
   the stator is located between an inner peripheral surface of the lower casing and an outer peripheral surface of the can;
   the can includes a protruding portion protruding in a radial direction from the outer peripheral surface of the can;
   the stator includes an annular body and stator teeth;
   the stator teeth include a winding portion protruding in a radial direction from an inner peripheral surface of the annular body, and a distal end portion located at a radially innermost end of the winding portion; and
   a lower end surface of the protruding portion and an upper end surface of the distal end portion are in contact with each other.

2. The pump according to claim 1, further comprising:
   a bearing portion that rotatably holds a shaft connected to the rotor and the impeller; and
   a bearing holding portion that holds the bearing portion; wherein
   an inner peripheral surface of the can and an outer peripheral surface of the bearing holding portion oppose each other; and
   a seal is located between the inner peripheral surface of the can and the outer peripheral surface of the bearing holding portion.

3. The pump according to claim 1, wherein a position of the winding portion and a position of the protruding portion overlap in a circumferential direction.

4. The pump according to claim 1, wherein
   the protruding portion includes a plurality of the protruding portions;
   the stator teeth are arranged at a first interval DA along the circumferential direction;
   one of the plurality of protruding portions and another of the plurality of protruding portions directly adjacent to the one of the plurality of protruding portions are arranged at a second interval DB along a circumferential direction; and
   DB is not a multiple of DA.

5. The pump according to claim 4, wherein all adjacent pairs of the plurality of protruding portions are arranged at the second interval DB along the circumferential direction.

6. The pump according to claim 1, wherein
   the can further includes a flange portion;
   the flange portion is located on the outer peripheral surface of the can;
   the protruding portion extends along an axial direction; and
   an upper end of the protruding portion and a lower end of the flange portion are connected.

7. The pump according to claim 1, wherein a synthetic resin is located between the inner peripheral surface of the lower casing and the outer peripheral surface of the can.

8. The pump according to claim 7, further comprising:
   a lid radially opposing the outer peripheral surface of the can; wherein
   the lid includes a plate-shaped body located at an upper end of the lower casing and a through hole penetrating the plate-shaped body.

9. The pump according to claim 1, wherein a maximum diameter of the impeller is smaller than a maximum diameter of the can in a radial direction.

* * * * *